UNITED STATES PATENT OFFICE.

HEMAN S. LUCAS, OF CHESTER, MASSACHUSETTS.

IMPROVEMENT IN PROCESSES FOR MAKING A WATER AND FIRE PROOF PAPER.

Specification forming part of Letters Patent No. 218,389, dated August 12, 1879; application filed March 21, 1879.

*To all whom it may concern:*

Be it known that I, HEMAN S. LUCAS, of Chester, county of Hampden, and State of Massachusetts, have invented a new and useful Process for Making a Combined Water and Fire Proof Paper, which process is fully set forth in the following specification.

The object of my invention is to provide for account-books, monetary papers, and other uses a paper which shall be as nearly indestructible by fire and water as may be practicable, so that the losses incured by the destruction of valuable papers by those elements may be greatly reduced.

In carrying out my invention I make a strong solution of common salt and alum dissolved in water. Into the above solution I put a mixture of ordinary white or other colored paper-pulp and asbestus, likewise reduced to a pulp, in the proportions of about two-thirds of the former to one-third of the latter.

The above-named solution, paper-pulp, and asbestus-pulp are mixed together in the ordinary mixing-tub of a Fourdrinier machine, and from said mixing-tub are run off through said machine and treated like ordinary paper-pulp, the product of the said machine being a paper of asbestus and paper-pulp strongly saturated with common salt and alum, in sheets or rolls, as may be desirable. After the said paper has been produced, as above described, I run it through a bath of gum-shellac dissolved in alcohol or other suitable volatile solvent of that gum, and subsequently through ordinary calender-rolls like ordinary paper, after which last-named operation the paper is ready to be cut into such sized sheets as may be required for use. The effect of the said strong solution of salt and alum upon the paper is to greatly strengthen it and to increase its fire-resisting qualities. The shellac bath to which it is treated causes the paper to become thoroughly permeated with the said gum, so that the paper becomes water-proof to such an extent that long boiling in water does not disintegrate it, and the presence of the gum in and upon the surface of the paper seems to present no obstacle to the proper and usual absorption of ink, either printing or writing. Thus, by the combination of the asbestus, salt, and alum in the paper, it is rendered so far fire-proof that a direct exposure to an intense fire does not burn up the substance of the paper to an extent that interferes with safely handling it, and when exposed to great heat in books, or between metallic plates, a number of sheets together, it is much less injured by the fire.

The addition of the gum-shellac to the said paper makes it, for all practicable purposes, water-proof, as before stated, so that if account-books, valuable documents, bank-bills, and other monetary papers in the manufacture of which my improved paper is used be subjected to the action of the fire and the water, either one or both, in a burning building, such books, papers, &c., will not be injured to such an extent as to destroy their value.

So far as the water-proof quality of my paper is concerned, it is equally valuable for use in ordinary correspondence, for, should a mail become accidentally wet, or, as is often the case, remain under water for a long time, my paper would not be thereby affected, but all letters written thereon would be preserved in proper form, and their matter remain legible.

I am aware that the mixture of alum and salt with asbestus in making paper of the latter material has been practiced heretofore, and I do not claim that; but What I do claim as my invention is—

The hereinbefore-described process for producing a combined fire and water proof paper, by mixing asbestus or asbestus and paper-pulp, in about the proportions above stated, in a strong solution of common salt and alum disolved in water, and making paper therefrom in the ordinary way, and subsequently passing the said paper through a bath of gum-shellac disolved in alcohol, or other solvent of said gum, substantially as set forth.

HEMAN S. LUCAS.

Witnesses:
WALTER A. LOVELACE,
H. J. LONGLEY.